(12) United States Patent
D'Angelo

(10) Patent No.: US 6,764,627 B2
(45) Date of Patent: Jul. 20, 2004

(54) METHOD OF MAKING CORRUGATED PART

(75) Inventor: Thomas M. D'Angelo, Plymouth, MI (US)

(73) Assignee: Hahn Elastomer Corporation, Plymouth, MI (US)

( * ) Notice: Subject to any disclaimer, the term of this patent is extended or adjusted under 35 U.S.C. 154(b) by 0 days.

(21) Appl. No.: 09/533,741

(22) Filed: Mar. 23, 2000

(65) Prior Publication Data

US 2003/0160356 A1 Aug. 28, 2003

(51) Int. Cl.$^7$ ................................................. B29C 49/04
(52) U.S. Cl. .................. 264/150; 264/167; 264/178 R; 264/508; 264/514; 264/516; 425/393; 425/396; 425/532
(58) Field of Search ................................ 264/906, 508, 264/512, 514, 516, 178 R, 167, 148, 150, 162; 425/393, 396, 532

(56) References Cited

U.S. PATENT DOCUMENTS

| | | | | |
|---|---|---|---|---|
| 3,784,346 A | * | 1/1974 | Maroschak | 425/532 |
| 3,843,758 A | | 10/1974 | Maroschak | |
| 3,859,025 A | * | 1/1975 | Maroschak | 425/531 |
| 3,891,733 A | * | 6/1975 | Maroschak | 264/40.7 |
| 4,319,872 A | | 3/1982 | Lupke et al. | |
| 4,424,834 A | | 1/1984 | Sumi et al. | |
| 4,439,130 A | | 3/1984 | Dickhut et al. | |
| 4,509,911 A | * | 4/1985 | Rosenbaum | 425/532 |
| 4,718,844 A | | 1/1988 | Dickhut et al. | |
| 5,320,797 A | * | 6/1994 | Hegler et al. | 264/511 |
| 5,405,569 A | * | 4/1995 | Lupke | 264/504 |
| 5,429,398 A | * | 7/1995 | Lupke | 285/374 |
| 5,476,630 A | * | 12/1995 | Orsing | 264/508 |
| 5,531,583 A | | 7/1996 | Berns et al. | |
| 5,900,205 A | * | 5/1999 | Sadr et al. | 264/531 |
| 5,992,469 A | * | 11/1999 | Hegler | 138/109 |
| 6,051,789 A | * | 4/2000 | Kato | 174/68.3 |

* cited by examiner

Primary Examiner—Stefan Staicovici
(74) Attorney, Agent, or Firm—Reising, Ethington, Barnes, Kisselle, P.C.

(57) ABSTRACT

A method for continuously forming molded parts includes providing an extruder; directing a hollow column of plastic material from the extruder; providing a plurality of die blocks each including planar end segments having differing geometry and joined by the intermediate convoluted segments; continuously moving such die blocks for receiving and forming the hollow column into strut boots with planar end segments and intermediate convoluted segments and advancing the shaped column of plastic material from the continuously moving die blocks and providing a cutter synchronized to the movement of the shaped column for separating the planar end segments to form one or more parts having planar end segments of the same or differing geometry in each part or with differing geometry from part to part.

15 Claims, 3 Drawing Sheets

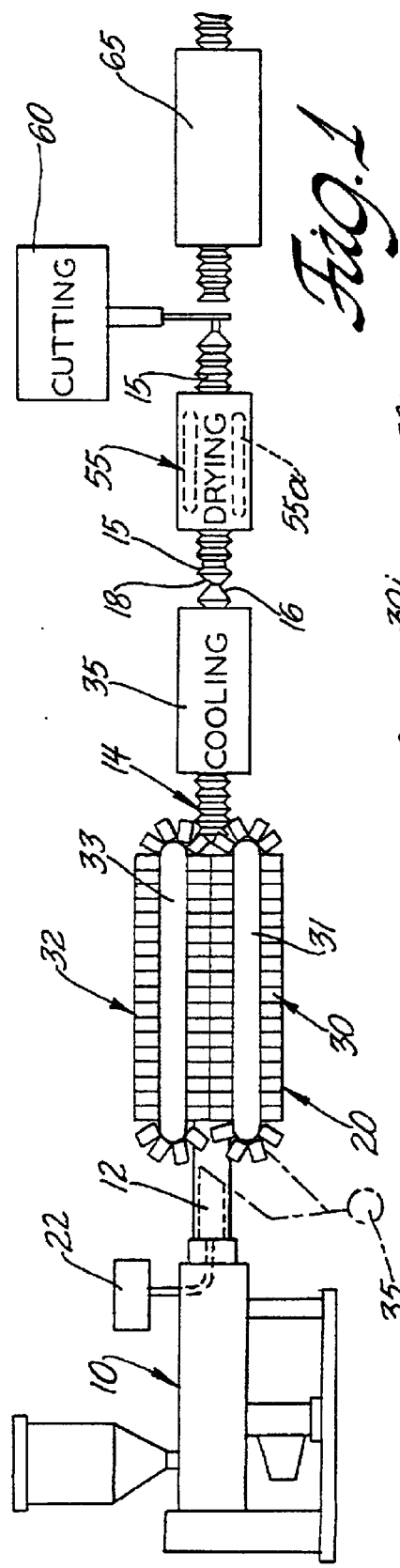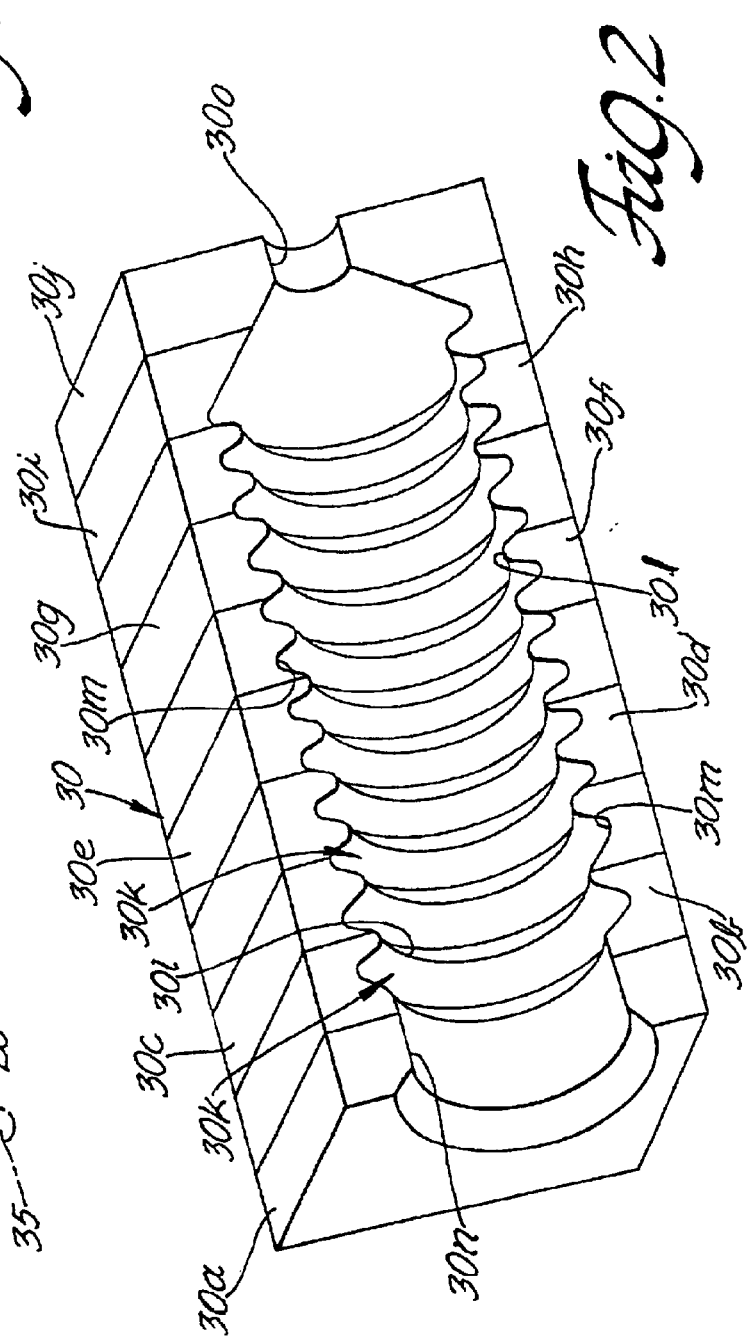

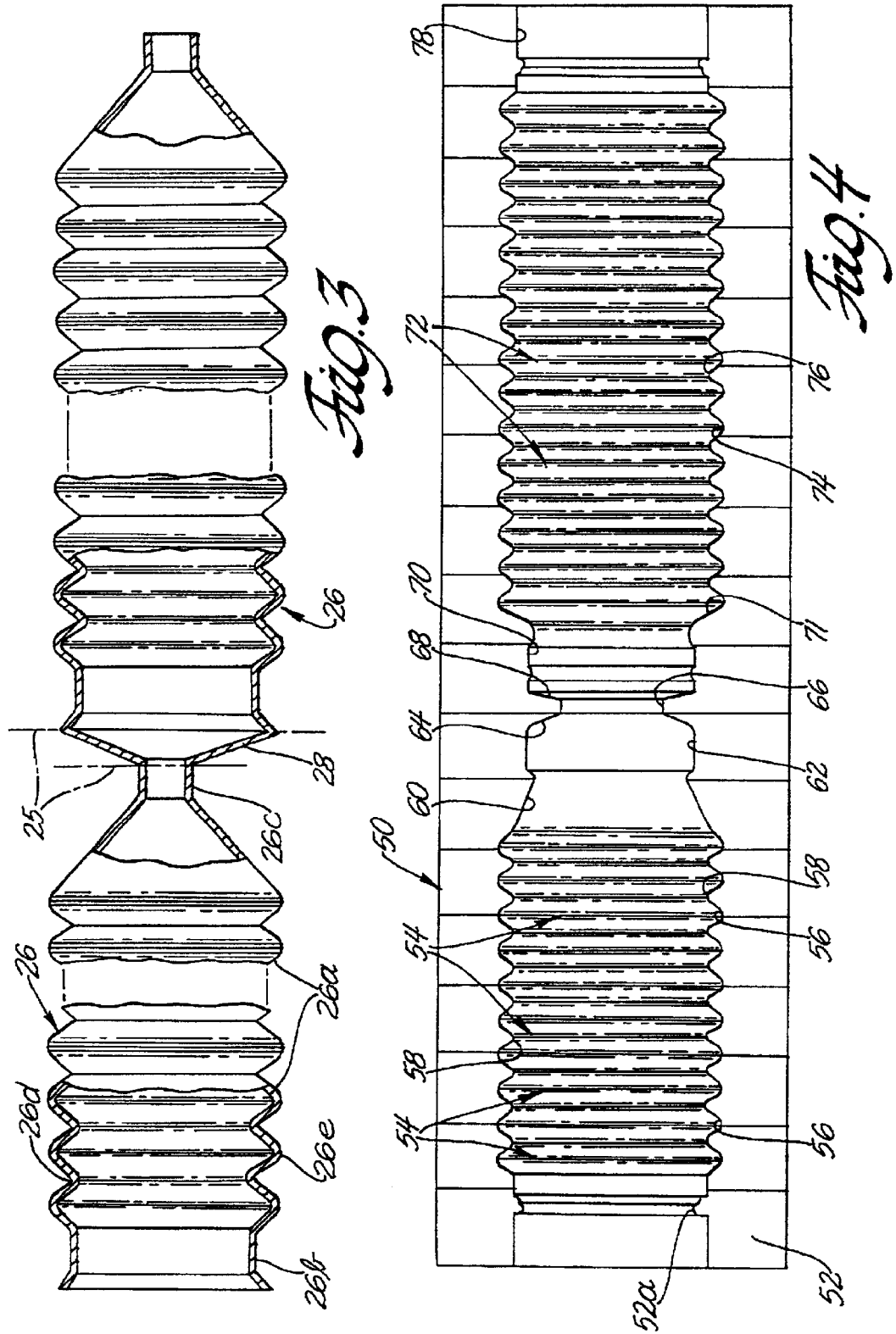

METHOD OF MAKING CORRUGATED PART

This invention relates to methods for corrugating parts and more particularly to methods for corrugating strut boots having planar end segments joined by an intermediate corrugated segment.

BACKGROUND OF THE INVENTION

Methods for corrugating hollow parts are known in which an extruder directs a hollow column with respect to moveable die blocks that shape the hollow column end to end with a plurality of convolutions.

Examples of such molded parts and methods are shown in U.S. Pat. Nos. 3,843,758, 4,319,872, 4,439,130, 4,718,844 and 5,531,583. In the past such molded parts have utilized a mold part that involves formation of a plurality of convolutions end to end of the mold block such that the resultant molded part is a corrugated tube suitable for use in irrigation and other like applications.

It is also known to separately mold strut boots and the like that include planar end segments for connection to stationary and moveable members and wherein a plurality of convolutions are formed between the planar end segments for providing for relative movement between the stationary and moveable parts to which the strut boot is attached are formed by one or more molding steps.

While suitable for their intended purpose none of the aforesaid prior art methods are able to meet cost and product rate objectives suitable for meeting the cost requirements of motor vehicle manufacturers and other customers requiring high quality, and low cost parts.

SUMMARY OF THE INVENTION

According to the present invention these objectives are met by a method for continuously forming molded parts including providing an extruder, directing a hollow column of plastic material from said extruder; providing a plurality of die blocks each including planar end segments having differing geometry and joined by intermediate convoluted segments; continuously moving such die blocks for receiving and forming the hollow column with planar end segments and intermediate convoluted segments and advancing the shaped column of plastic material from the continuously moving die blocks and providing a cutter synchronized to the movement of the shaped column for separating the planar end segments to form one or more parts having planar end segments of the same or differing geometry in each part or with differing geometry from part to part.

An object of the invention is to provide a process in which such planar end segments are formed with identical geometry and wherein a continuous molded extrusion shape is passed from the moveable mold blocks having a repeating pattern A-B-C-A-B-C defined by the expression $(A-B-C)_n$.

A further object of the invention is to provide a process wherein the end segments are formed with differing geometries and wherein the continuous molded extrusion has a repeating pattern A-B-C-C'-B-A-A-B-C-C'-B-A defined by the expression $(A-B-C-C'-B-A)_n$.

Yet another feature of the invention is to provide extrudent material for the aforesaid process that is a thermoplastic flexible synthetic polymer such as thermoplastic vulcanizates (TPV's); thermoplastic polyolefins (TPO's); ionomer resins, such as Surlyn; flexible PVC resins; thermoplastic elastomers (TPE's); flexible polyurethane polymers and the base is a rigid thermoplastic such as polypropylene; filled polypropylene; talc-filled polypropylene; polyethylene; high density polyethylene; polystyrene; PVC resins; ABS resins; TPO resins; Nylon resins; Metallocene polymers or a flexible thermoplastic material such as thermoplastic vulcanizates (TPV's); thermoplastic polyolefins (TPO's); ionomer resins, such as Surlyn; flexible PVC resins; thermoplastic elastomers (TPE's); flexible polyurethane polymers.

BRIEF DESCRIPTION OF THE DRAWINGS

FIG. 1 is a perspective view of apparatus for practicing the present invention;

FIG. 2 is an enlarged perspective view of a plurality of mold blocks used in the process of the present invention;

FIG. 3 is an enlarged side elevational view, partially sectioned, of a part made by the process of the present invention;

FIG. 4 is an enlarged side elevational view of mold blocks used in another embodiment of the process of the present invention.

DESCRIPTION OF PREFERRED EMBODIMENT

Figure 5:
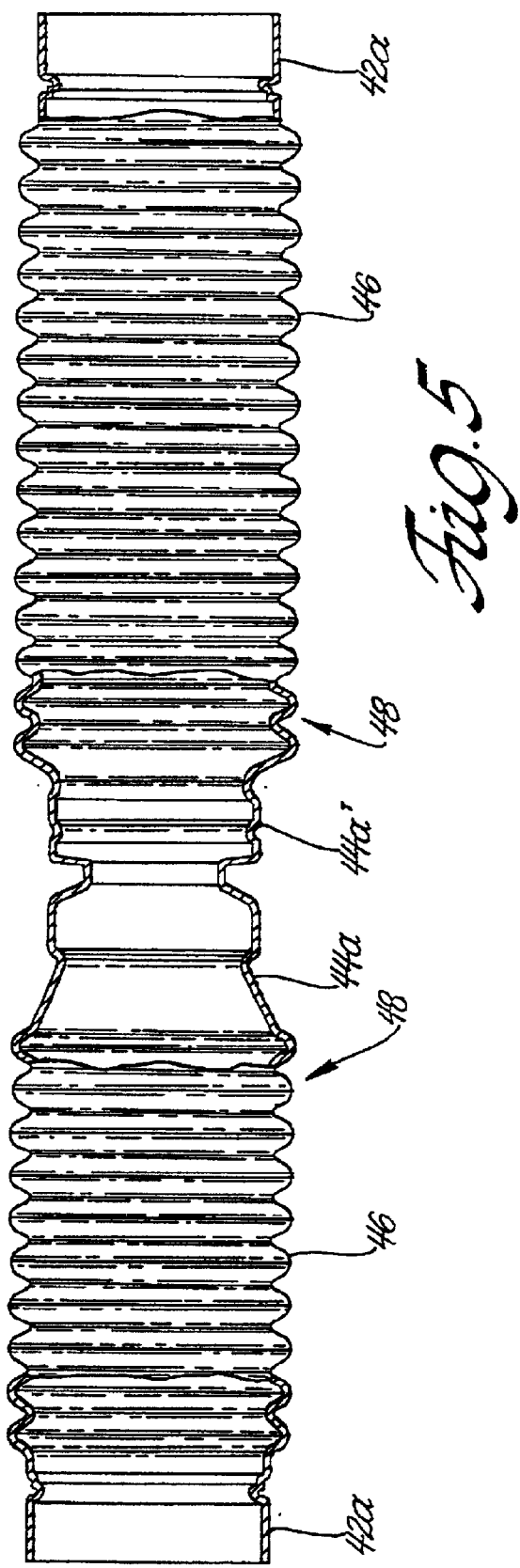
FIG. 5 is an enlarged side elevational view, partially sectioned, of another embodiment of a part made by the method of the present invention.

Referring now to FIG. 1, an extruding machine 10 is arranged to continuously extrude and feed a tube 12 of hot plastic material to a corrugating machine 20. The corrugating machine includes two sets of moveable mold tracks 30, 32 constructed in accordance with the present invention to be respectively driven by vertically spaced concepts 31, 33 whereby a continuously formed hollow molded extruded part 14 is directed from the blow molding machine having spaced groups or sets of convolutions 15 separated from each other by planar segments 16, 18 having the same or differing geometry and joined to one another as the hollow molded extruded part moves from the blow molding machine.

The machine 20 has known sources of compressed heated air 22 that is directed into the tube 12 as it passes through the machine 20, the air heat expands and shapes the tube 12 against the surface of the mold cavities; can be either blown or vacuum or combination of both. Such shaping molds the annular sets of convolutions 15 and planar end segments 16, 18 along the length of the tube 12 as it moves from the blow molding machine or corrugator 20.

FIG. 3 represents a strut boot as one typical embodiment of an elastic shaped article according to the present invention. In the diagram, a strut boot 26. In the strut boot, 26a denotes the bellows portion 15 and 26b, 26c the connecting end portions.

The elastic shaped article according to the present invention is useful for the production of boots, ducts, hoses, tubes, other sealing members, covering members and so on which are expected to possess elasticity and oil resistance. Such articles are of the type used in motor vehicles such as automobiles and suvs (sports utility vehicles), snowmobiles, construction machines such as bulldozers, industrial machines such as robots, machine tools, hydraulic machines and pneumatic machines.

Depending on the particular use to which the elastic shaped article according to the present invention is put; the hardness of the article may be suitably selected without departing from the spirit of the invention. When the elastic shaped article is used in automotive boots such as shock absorber boots, rack and pinion steering gear boots, suspension strut boots and constant velocity joint boots, it acquires high mechanical strengths and high elastic recovery of bellows, the properties ideal for automotive boots, by fixing the hardness of the TE above the level of 60 by the Shore A scale, the hardness of the soft PVC below the level of 87 by the Shore A scale, and the overall wall thickness ratio of the TE layer to the soft PVC layer in the range of 50:50 to 0.5:99.5. Thus, the boots neither sustains cracks under impacts exerted by flying pebbles nor suffers from separation of joined ends owing to loss of elasticity but are permitted to manifest the features of this invention.

In the embodiment of FIGS. 2 and 3 the corrugator 20 includes two sets of a plurality of die blocks 30a–30j moved on conveyor tracks 31, 33 to open and close to form a continuously advancing mold. One of the sets is shown in FIG. 2 with it being understood that a like set is provided that is joined and separated by the conveyors 31, 33 to form a mold surface against which the extruded tube 12 is expanded by heated air to continuously blow mold a series of strut boots 26 shown in FIG. 3. The die blocks 30b–30i combine to form repeating semi-circular die surfaces generally designated 30k. The die surfaces 30k include spaced sets of alternating ribs and valleys 30l, 30m joined by end geometry surfaces defined by cavities 30n, 30o.

As the tube of hot plastic material is extruded into the rear portion of the blow molding zone, heat compressed air 22 or other fluid under pressure is introduced into the tube to expand the same against the mold cavity 30k, and thereby mold annular corrugations of alternating ribs and valleys along the length of the tube and the surfaces at cavities 30n, 30o. Also, as is well known, the moving die blocks 30a–30j are driven in two endless paths by suitable drive means shown schematically at 35 in FIG. 1, which drive means 35 continuously moves the cooperating sets of die blocks on the conveyors 31, 33 forwardly along the blow molding zone to deliver the molded corrugated plastic tube 14 forwardly at a predetermined speed.

An enlarged view of a portion of the corrugated tube 14 is shown in FIG. 3 wherein it will be observed that the valleys and ribs of the tube 14 are respectively designated at 26d, 26e. The tube may be of lightweight construction preferably with a wall thickness of no greater than about 0.060 inch and may be of a nominal diameter of about 0.040 inches. A tube having a four-inch nominal diameter, for example, may have an internal diameter of about 2.70 inches measured at the interior of the valley 26d, and an external rib diameter of 3.25 inches. Also, by way of example, the tube may include about 12 ribs per linear foot, with each rib 26e having a width of approximately ½ inch, the height of each rib when measured from the annular valleys 26d being about 0.26 inch, and the width of the annular valleys taken between the junctures of the side walls of the adjacent ribs 26e being about 0.50 inch.

The embodiment shown in FIG. 3 includes a mold forming the same part suitable for use in a single application; the complete die mold has two sets of end segments 30n, 30o formed on either end of two sets of ribs and valleys 30l, 30m. When the die molds are joined by being advanced continuously in the corrugator 20, they form cavities that define two parts 26. The parts 26 each have planar end connections 26b, 2c, respectively. The end connections 26b have the same planar geometry and are suited for connection to the end of one strut boot application and the ends 26c have the same planar geometry suitable for connection to the opposite end of the one same strut boot application. The tube 12 once molded to the aforesaid shape will have a continuous, molded extrusion, generally designated 14 in FIG. 1, that will be directed from the corrugator 20 to a cooling tank 35 thence to a dryer 55 and to a cutter 60 that is programmable to be synchronized to the speed of the molded extrusion as it is moved by a conveyor 55a in dryer 55 and operative to cut the continuously advancing molded extrusion 14 at joints 25 formed between the end connections 26b, 26c. The separated parts 24, 26 are then segregated from the scrap 28 trimmed by the cutter at a separator 65. For purposes of definition the segment 26b can be defined as a part segment A constituting a non-convoluted geometry in the molded part 26; the convolutions 26a can be defined as a part segment B of shaped elastic material and segment 26c can be defined as a part segment C constituting a non-convoluted geometry in the molded tube 14 of the same geometry of part segment A. In such case, the continuous molded tube 28 has repeating segments A-B-C-A-B-C, etc defined by the following formula:

$$(A\text{-}B\text{-}C)_n$$

However, it is more common that the ends of a part are not identical and that the design of the tooling and the process are enhanced when common elements are adjacent to each other for example, the end segments of smaller diameter in different parts are joined and the end segments of larger diameter are joined. In such case, shown in FIG. 5, end segments 42a, 44a are joined by convolutions 46. The part segment 42a can be defined as part segment A and the part segment 44a can be defined as part segment C. In this embodiment the part segment C for one part differs slightly from another part and will be referred to as C'. In such case, a continuously molded tube 48 has repeating segments A-B-C-C'-B-A-A-B-C-C'-B-A, etc defined by the following formula:

$$(A\text{-}B\text{-}C\text{-}C'\text{-}B\text{-}A)_n$$

As in the case of the first embodiment, this configuration is formed by a plurality of mold blocks shown in FIG. 4, they combine to form a mold half 50 having a tubular planar segment 52 with a reduced diameter segment 52a. The reduced diameter segment is in communication with spaced semi-annular cavities 54 having valleys 56 and ridges 58 shaped to form one half of the convolutions 46 in the part shown in FIG. 5. The mold part 50 further includes a convergent segment 60 that is joined to a semicircular portion 62 of reduced diameter to that of the tubular planar segment 52. The semicircular diameter portion 62 is joined to a second convergent segment 64 that merges with a radially inwardly located small diameter segment 66 of the mold half 50. The small diameter segment 66 merges with a generally vertically disposed wall segment 68 that merges with a semicircular surface 70 having a diameter similar to that of the portion 62. The mold half 50 includes a outwardly divergent semi-annular surface 71 that is joined to spaced semicircular cavities 72 having valleys 74 and ridges 76 to form one half of the convolutions 46 in the part shown in FIG. 5. The mold half 50 terminates at its opposite end in a semicircular surface 78. When like mold halves are joined in the corrugator 20 they define the surfaces of the part 48 shown in FIG. 5.

As in the first embodiment, the process includes the steps of extruding a hollow tube of thermoplastic material; providing mold halves having surfaces with the formula $(A\text{-}B\text{-}C\text{-}C'\text{-}B\text{-}A)_n$; shaping a tube 12 of heat thermoplastic material against the aforesaid surfaces of the joined mold halves 50 (one shown in FIG. 4); continuously feeding a molded tube 48 having ends and convolutions with the formula (A-B-C-

C'-B-A)$_n$ from the corrugator 20; passing the molded tube 48 through a cooling tank and a dryer then cutting the molded tube 28 between the segments C-C' to form separated elastic convoluted parts of either the same or differing end connection configurations.

Another embodiment is wherein the mold halves are configured with differing geometries and wherein the continuous molded extrusion has a repeating pattern A-B-C-C-B-A-A-B-C-C-B-A defined by the expression (A-B-C-C-B-A)$_n$.

The embodiments of the invention in which an exclusive property or privilege is claimed are defined as follows:

1. A method for continuously forming a molded part which is a flexible boot for an automotive vehicle comprising providing an extruder; directing a hollow column of plastic material from said extruder; providing a plurality of die blocks defining mold halves including planar end segments having differing geometry and joined by intermediate convoluted segments; continuously moving such die blocks for receiving and forming the hollow column into a continuous shape having spaced end segments and intermediate convoluted segments and advancing the shaped column of plastic material from the continuously moving die blocks; providing a cutter; synchronizing the cutter action to the movement of the shaped column for separating the end segments to form one or more boots having planar end segments of differing geometry in each automotive vehicle boot.

2. The process of claim 1 wherein the mold halves are configured to have semicircular surfaces thereon to form end segments of differing geometry from end to end and from part to part.

3. The process of claim 1 wherein each of said mold halves has a surface thereon between end segment surfaces thereon; said cutter synchronized with the continuous formation of a molded tubular member by the corrugator for removing said surface from the end segments.

4. The process of claim 1 wherein a continuous molded extrusion shape is passed from the moveable mold blocks having a repeating pattern A-B-C-A-B-C defined by the expression (A-B-C)$_n$.

5. The process of claim 1 wherein the mold halves are configured with differing geometries and wherein the continuous molded extrusion has a repeating pattern A-B-C-C'-B-A-A-B-C-C'-B-A defined by the expression (A-B-C-C'-B-A)$_n$.

6. The process of claim 2 wherein a continuous molded extrusion shape is passed from the moveable mold blocks having a repeating pattern A-B-C-A-B-C defined by the expression (A-B-C)$_n$.

7. The process of claim 2 wherein the mold halves are configured with differing geometries and wherein the continuous molded extrusion has a repeating pattern A-B-C-C'-B-A-A-B-C-C'-B-A defined by the expression (A-B-C-C'-B-A)$_n$.

8. The process of claim 3 wherein a continuous molded extrusion shape is passed from the moveable mold blocks having a repeating pattern A-B-C-A-B-C defined by the expression (A-B-C)$_n$.

9. The process of claim 3 wherein the mold halves are configured with differing geometries and wherein the continuous molded extrusion has a repeating pattern A-B-C-C-B-A-A-B-C-C-B-A defined by the expression (A-B-C-C-B-A)$_n$.

10. The process of claim 1 wherein extruded material for the process is a thermoplastic flexible synthetic polymer.

11. The process of claim 1 wherein extruded material for the process is a synthetic polymer selected from the group consisting of thermoplastic vulcanizates (TPV's); thermoplastic polyolefins (TPO's); ionomer resins; flexible PVC resins; thermoplastic elastomers (TPE's); filled polypropylene; talc-filled polypropylene; polyethylene; high density polyethylene; polystyrene; PVC resins; ABS resins; Nylon resins; Metallocene polymers and flexible polyurethane polymers.

12. The process of claim 2 wherein extruded material for the process is a thermoplastic flexible synthetic polymer.

13. The process of claim 2 wherein extruded material for the process is a synthetic polymer selected from the group consisting of thermoplastic vulcanizates (TPV's); thermoplastic polyolefins (TPO's); ionomer resins; flexible PVC resins; thermoplastic elastomers (TPE's); filled polypropylene; talc-filled polypropylene; polyethylene; high density polyethylene; polystyrene; PVC resins; ABS resins; Nylon resins; Metallocene polymers and flexible polyurethane polymers.

14. The process of claim 3 wherein extruded material for the process is a thermoplastic flexible synthetic polymer.

15. The process of claim 3 wherein extruded material for the process is a synthetic polymer selected from the group consisting of thermoplastic vulcanizates (TPV's); thermoplastic polyolefins (TPO's); ionomer resins; flexibility PVC resins; thermoplastic elastomers (TPE's); filled polypropylene; talc-filled polypropylene; polyethylene; high density polyethylene; polystyrene; PVC resins; ABS resins; Nylon resins; Metallocene polymers and flexible polyurethane polymers.

* * * * *